United States Patent Office 3,068,192
Patented Dec. 11, 1962

3,068,192
SUSPENSION POLYMERIZATION IN THE
PRESENCE OF A PHOSPHOLIPID
Roy A. White, Hazardville, Conn., assignor to Cosden
Petroleum Corporation, Big Spring, Tex., a corporation
of Delaware
No Drawing. Filed Dec. 19, 1958, Ser. No. 781,441
11 Claims. (Cl. 260—45.5)

This invention relates to an improved method of polymerizing monomeric polymerizable materials to bead form by suspension polymerization. This form of polymer is also frequently referred to as pearl polymer or granular polymer.

In the art of polymerization, a suspension system is generally understood to be a mixture of water and finely-divided liquid droplets of polymerizable material suspended therein by agitation and to which has been added certain surface-active materials which help to disperse the polymerizable material at the beginning and maintain the polymer particles separated during the following polymerization, particularly through any sticky intermediate phases. A suspension of polymer beads is thus obtained from which the polymer beads can be separated either by decantation or centrifugation if the polymers are heavier than water; or by other well known separation processes such as filtration, if the beads are lighter than water.

This is in contrast to emulsion polymerization systems in which a more or less stable latex is formed that must be broken by coagulation or creaming before the polymer can be separated.

Polymerization in suspension systems is started and proceeds primarily in the finely-divided monomer phase by any free-radical-producing mechanism. Most commonly, a monomer-soluble catalyst is used such as azo compounds or peroxides. Many different peroxides are known and have been used in industry, but in technical suspension polymerization processes the most often employed organic peroxides are dibenzoyl peroxide, dicaproyl peroxide, dilauroyl peroxide, ditertiarybutyl perbenzoate, or mixtures of these. These peroxy catalysts are usually used in quantity up to about 1.0%, larger quantities tending to accelerate the rate of polymerization, and usually in the range of about 0.1 to 0.5% peroxy catalyst based on the monomer, the quantities given throughout being by weight.

Chain transfer agents may be used to modify the molecular weight and the properties of the polymers; for example, small amounts of mercaptans such as dodecyl mercaptan. The addition of agents that induce decomposition of peroxides into free radicals is often beneficent. The monomers or polymerizable materials may also contain lubricants, colorants, stabilizers, and other auxiliary agents in amounts insufficient to interfere with the polymerization.

It is known that bead polymers of ethylenic monomers may be produced in this manner, that is, as an aqueous suspension of the monomer in the presence of a dispersing agent and a peroxy catalyst. Because of their ability to act as dispersing agents and to prevent undesirable agglomeration of the polymerizing monomer, difficultly soluble phosphates of multivalent metals, such as calcium, barium and magnesium phosphates have been proposed as dispersing agents. These difficultly soluble phosphates have not been found wholly satisfactory because of the restrictive conditions under which the art has suggested their use, which nevertheless is often found to be erratic.

It has also been suggested that some of these difficulties may be met by the use of phosphate particles of submicroscopic size and by the use of such phosphate particles having prescribed portions of three or more equivalents of metal or base, and their extension by the use of critical amounts of certain surface active agents.

In general these efforts, to the extent that they have overcome specific difficulties, have not provided the stability of the suspension system or the reliable control of the reaction for satisfactory industrial practice.

It is the principal object of the present invention to provide a method which makes possible the use of difficultly soluble phosphates of multivalent metals as dispersing agents, improves the stability of such a suspension system and provides an improved control of the polymerization, including the bead size of the polymeric product while reducing tack and clumping during the polymerization. Thus, this invention provides an improved practice and procedure of suspension polymerization of polymerizable ethylenic compounds from the industrial point of view.

While the invention is applicable to the suspension polymerization of any polymerizable ethylenically unsaturated monomer, it is particularly useful for polymerization of vinyl aromatics and heterocyclics, especially styrene, alkyl styrenes, such as methyl and dimethyl styrene, halogenated styrenes, vinyl pyridine, divinylbenzene and the like. It is also useful in the polymerization of vinyl chloride, vinyl acetate, vinyl propionate, vinylidene chloride, the lower alkyl esters such as methyl or ethyl esters of acrylic or methacrylic acids, acrylonitrile, butadiene, chloroprene and mixtures of such ethylenically unsaturated monomers. It is useful for polymerizing such monomers or mixtures thereof suspended with other finely-divided polymers such as latices of natural and synthetic rubbers and other polymeric latices, or solutions of polymers in said monomer liquid, such as a solution of butadiene/styrene copolymer, for example, GRS rubber, dissolved in styrene monomer. Other typical synthetic rubber polymers are polybutadiene, copolymer of butadiene and acrylonitrile and copolymers of butadiene with isobutylene.

In the suspension system of the present invention it has been found that acetic acid in amounts of 0.002% to 0.004%, or water soluble acetate, that is, acetate salts of alkali, alkaline earth metals or heavy metals such as sodium acetate or barium acetate, in amounts up to 0.1% of the total suspension are useful and advantageous, giving higher conversions and less residual monomer in the polymer and accelerating the polymerization. This also has a beneficial effect on the stability of the suspension system because it lessens the amount of time during which the polymerizing droplets are in the sticky stage and, therefore, most likely to clump.

Preferred inorganic dispersants are difficultly soluble phosphates of multivalent metals of suitable particle size which can be prepared by metathetical reaction in situ from the corresponding soluble salts; or they may be added as previously prepared, finely divided solids.

A water soluble surfactant is used, of which the preferred water soluble surfactant is an alkali metal salt of an alkyl sulfate ester having about 5 to 9 carbon atoms such as sodium octyl sulfate, but others, like sodium capryl sulfate, may be used.

It has been found that the well known adverse effects of relatively high concentrations of anionic surfactant in which the cation is metallic, can be eliminated and greater stability obtained by addition of a small amount of a monomer-soluble surfactant of the type exemplified by the phospholipids to the suspension system containing as dispersants difficultly soluble, multivalent metal phosphates. Especially suitable are the phosphatides, such as lecithin or cephalin.

It has been further found that the use of a small amount of such phosphatide as lecithin combined with a relatively larger amount of a water soluble anionic surfactant having a metallic cation not only increases the stability of a suspension system using inorganic dispersants, but it also permits greater freedom in the amount of such anionic surfactant added to the system. This is important, since by variation of the amount of such surfactant added it has been found that the particle size distribution of the final polymer can be varied, which is valuable in industrial practice.

The amount of such water soluble anionic surfactant may vary between about 0.005% and about 0.15% of the suspension, but the range found to be particularly useful is 0.06% to 0.075%. The phosphatide, such as lecithin addition should be in the range 0.0003% to 0.004%, but preferably between 0.00045% and 0.002%.

In carrying out the process the phosphate and the anionic surfactant are added to the water of the suspension system with agitation, usually heating to a temperature in the range of about 40 to 100° C. If the phosphate is a soluble phosphate like that of an alkali metal to be precipitated, the soluble salt of the precipitating metal, i.e. a soluble salt of the alkali earth metal, is added as a solution in a small aliquot portion of the water, added with agitation gradually, whereby the hydroxy phosphate of the alkali earth metal is formed in small particles in the agitated aqueous medium. Thereafter most of the monomer is added as the agitation is continued and finally the remaining components, such as the phospholipid, the peroxy catalyst and acetic acid or acetate salt dissolved in a small remaining portion of the monomer, is added with agitation. The heating of the suspension system, while it may be applied from early stages, actually needs to be applied only during the actual polymerization with agitation so that the heat may take place after the suspension system is established with agitation. The agitation at a desired temperature is continued until the bead-like polymer particles are formed as a suspension in the agitated liquid over a polymerization period, as needed, usually about 6 to 20 hours. Some of the conditions may be varied with the characteristics of the particular monomer being polymerized as will appear from the specific conditions set forth in the following examples.

The invention is illustrated by the following examples:

*Example I*

| | Parts (by weight) |
|---|---|
| Water | 5000 |
| Calcium chloride (CaCl$_2$.2H$_2$O) | 28 |
| Trisodium phosphate (Na$_3$PO$_4$.12H$_2$O) | 39 |
| Sodium octyl sulfate | 6 |
| Styrene monomer | 5000 |
| Benzoyl peroxide | 12.5 |
| Lecithin | 0.047 |
| Acetic acid | 0.29 |

4500 parts of the water are charged to a reactor, and a trisodium phosphate and the sodium octyl sulfate are added and dissolved with agitation. The calcium chloride is dissolved in the remaining water and this solution is gradually added to the reactor with good agitation. A very fine dispersion of calcium hydroxyphosphate is obtained.

The agitation is stopped and 4500 parts of styrene monomer are added, immediately followed by the remaining 500 parts styrene in which the lecithin, the benzoyl peroxide, and the acetic acid have been dissolved.

Agitation is started and a homogeneous dispersion is soon obtained. The temperature is now increased to 95° C. within one hour and maintained at this level until the polymerization reaction is completed, which requires about 6–8 hours. Typical conversions of styrene monomer to polystyrene are:

| | Percent |
|---|---|
| After 6 hours at 95° C | 96.2 |
| 7 | 97.5 |
| 8 | 98.4 |

The polymer slurry containing the suspended bead-like polystyrene is acidified to a pH of 3 with hydrochloric acid and centrifuged. After washing and drying, the product is a clear, non-tacky, bead-like material of which 90% by weight passes through a 40-mesh Tyler standard screen but remains on the 100 mesh screen.

*Example II*

The following formulation may be used for preparation of a copolymer of styrene and acrylonitrile:

| | Parts (by weight) |
|---|---|
| Water | 5000 |
| Calcium chloride (CaCl$_2$.2H$_2$O) | 28 |
| Trisodium phosphate (Na$_3$PO$_4$.12H$_2$O) | 41 |
| Sodium octyl sulfate | 6.5 |
| Styrene monomer | 3500 |
| Acrylonitrile | 1500 |
| Lauroyl peroxide | 50 |
| Lecithin | 0.2 |

Charge 4500 parts water to the reactor and dissolve the trisodium in it with agitation. Dissolve the calcium chloride and the sodium octyl sulfate in the remaining 500 parts water and add this solution to the reactor whereby a finely-divided suspension of calcium hydroxyphosphate is formed.

Stop agitation and add 3000 parts of styrene and 1500 parts of acrylonitrile. Then add the remaining 500 parts of styrene in which the lecithin and the lauroyl peroxide have been dissolved. Start the agitation and increase the temperature to 62° C. within one hour. An exothermic polymerization reaction sets in and the temperature is maintained at 62° C. for 12 hours at which point conversion is over 90%. Remove the excess acrylonitrile and styrene by stripping with steam, letting the temperature increase to about 100° C. The polymer slurry is then acidified with hydrochloric acid to a pH of about 3 and centrifuged. After washing and drying a clear bead-like styrene/acrylonitrile copolymer is obtained with good impact strength.

*Example III*

The following formulation may be used for the preparation of a rubber-modified polystyrene:

| | Parts (by weight) |
|---|---|
| Water | 8000 |
| Calcium chloride (CaCl$_2$.2H$_2$O) | 50 |
| Trisodium phosphate (Na$_3$PO$_4$.12H$_2$O) | 70 |
| Sodium octyl sulfate | 7 |
| Styrene monomer | 4600 |
| Butadiene/styrene copolymer (75:25) | 400 |
| Benzoyl peroxide | 20 |
| Lecithin | 0.15 |
| Acetic acid | 0.3 |

Charge 7500 parts of water to the reactor and add the trisodium phosphate. Start agitation and heat the phosphate solution to 50° C. Dissolve the calcium chloride and the sodium octyl sulfate in the remaining 500 parts of water and add this solution to the reactor, whereby a finely-divided dispersion of calcium hydroxyphosphate is formed.

Dissolve 400 parts of a 75/25 butadiene/styrene copolymer polymerized in emulsion at low temperature ("cold rubber") and well washed after coagulation to remove soap, in 4400 parts of the styrene monomer. Dissolve the lecithin, benzoyl peroxide, and the acetic acid in the remaining styrene monomer, add this solution to the rubber-styrene solution, and mix well. Charge the mixture into the reactor over a period of about ½ hour, maintaining good agitation and increasing the temperature to 90° C. Polymerize for 16 hours, then acidify the polymer slurry with hydrochloric acid to a pH of 3 and centrifuge. After drying the bead-like product can be molded to articles with improved impact strength.

A series of experiments was run in accordance with Example I in which the monomer/water ratio, the inorganic dispersant system, and the benzoyl peroxide and acetic acid concentration were held constant while the lecithin and sodium octyl sulfate concentrations were varied. For comparison, one run (run 3) was made with only inorganic dispersant, leaving out the anionic surfactant and the lecithin; two runs (runs 1 and 2) in which the lecithin was omitted; and one run in which the anionic surfactant was omitted (run 7). The following results were obtained:

| Run | Lecithin, Parts/ 10,000 pts. Water plus Monomer | Sodium Octyl Sulfate, pts./ 10,000 pts. of Water plus Monomer | Resulting Polymer, Wt. Percent through 40 Mesh and Retained on 100 Mesh | |
|---|---|---|---|---|
| 1 | 0 | 6.0 | | Tacky surface, clumped. |
| 2 | 0 | 7.2 | | Do. |
| 3 | 0 | 0 | | Polymer formed lumps. |
| 4 | 0.024 | 6.0 | | Do. |
| 5 | 0.047 | 6.6 | | 90–95. |
| 6 | 0.160 | 6.0 | | 90–93. |
| 7 | 0.047 | 0 | | Coarse polymer (40–50). |

By the above disclosed method of the invention increased and dependable stability is secured and control of the particle distribution of the final polymer obtained, as well as a generally improved polymerization procedure from the point of view of industrial practice.

I claim:

1. The process of preparing polymer beads comprising agitating a liquid polymerizable ethylenically unsaturated monomer as a finely dispersed suspension in water at raised temperatures in the presence of a small quantity of a dispersing agent selected from the group consisting of phosphates of calcium, barium and magnesium and a small quantity of a phospholipid.

2. The process of preparing polymer beads comprising agitating a liquid polymerizable ethylenically unsaturated monomer as a finely dispersed suspension in water at raised temperatures in the presence of a small quantity of a dispersing agent selected from the group consisting of phosphates of calcium, barium and magnesium and a small quantity of lecithin.

3. The process of preparing polymer beads comprising agitating a liquid polymerizable ethylenically unsaturated monomer selected from the group consisting of a vinyl aromatic compound, vinyl chloride, vinyl acetate, vinyl propionate, vinylidene chloride, lower alkyl esters of acrylic acid, lower alkyl esters of methacrylic acid, acrylonitrile, butadiene, chloroprene, mixtures of said monomers, and mixtures of at least one of said monomers with a preformed rubbery polymer of the group consisting of a copolymer of butadiene with styrene, a copolymer of butadiene with acrylonitrile, a copolymer of butadiene with a lower isoolefine, polybutadiene and natural rubber as a finely dispersed suspension in water at raised temperatures in the presence of a small quantity of a dispersing agent selected from the group consisting of phosphates of calcium, barium and magnesium and a small quantity of a phospholipid.

4. The process of preparing polymer beads comprising agitating a liquid polymerizable ethylenically unsaturated monomer selected from the group consisting of a vinyl aromatic compound, vinyl chloride, vinyl acetate, vinyl propionate, vinylidene chloride, lower alkyl esters of acrylic acid, lower alkyl esters of methacrylic acid, acrylonitrile, butadiene, chloroprene, mixtures of said monomers and mixtures of at least one of said monomers with a preformed rubbery polymer of the group consisting of a copolymer of butadiene with styrene, a copolymer of butadiene with acrylonitrile, a copolymer of butadiene with a lower isoolefine, polybutadiene and natural rubber as a finely dispersed suspension in water at raised temperatures in the presence of a small quantity of finely divided phosphate particles of a metal of the group consisting of calcium, barium and magnesium and a small quantity of a surfactant comprising lecithin.

5. The process of preparing polymer beads comprising agitating a liquid polymerizable ethylenically unsaturated monomer selected from the group consisting of a vinyl aromatic compound, vinyl chloride, vinyl acetate, vinyl propionate, vinylidene chloride, lower alkyl esters of acrylic acid, lower alkyl esters of methacrylic acid, acrylonitrile, butadiene, chloroprene, mixtures of said monomers and mixtures of at least one of said monomers with a preformed rubbery polymer of the group consisting of a copolymer of butadiene with styrene, a copolymer of butadiene with acrylonitrile, a copolymer of butadiene with a lower isoolefine, polybutadiene and natural rubber as a finely dispersed suspension in water at raised temperatures in the presence of a small quantity of finely divided phosphate particles of a metal of the group consisting of calcium, barium and magnesium and a small quantity of a surfactant comprising a water soluble anionic surfactant and a monomer soluble phospholipid.

6. The process of preparing polymer beads comprising agitating a liquid polymerizable ethylenically unsaturated monomer selected from the group consisting of a vinyl aromatic compound, vinyl chloride, vinyl acetate, vinyl propionate, vinylidene chloride, lower alkyl esters of acrylic acid, lower alkyl esters of methacrylic acid, acrylonitrile, butadiene, chloroprene, mixtures of said monomers and mixtures of at least one of said monomers with a preformed rubbery polymer of the group consisting of a copolymer of butadiene with styrene, copolymer of butadiene with acrylonitrile, a copolymer of butadiene with a lower isoolefine, polybutadiene and natural rubber as a finely dispersed suspension in water at raised temperatures in the presence of a small quantity of finely divided phosphate particles of a metal of the group consisting of calcium, barium and magnesium and a small quantity of a surfactant comprising a water soluble anionic surfactant and a monomer soluble lecithin.

7. The process as defined in claim 6 wherein the monomer is styrene.

8. The process as defined in claim 6 wherein the monomer is styrene having dissolved therein a preformed polymer comprising a copolymer of butadiene with styrene.

9. The process as defined in claim 6 wherein the monomer soluble lecithin is present in quantity ranging from about 0.0003 to 0.004 by weight of the suspension system.

10. The method as defined in claim 6 wherein the water soluble anionic surfactant is present in quantity ranging from about 0.005 to 0.15 percent by weight of the suspension system.

11. The process of preparing polymer beads comprising agitating a liquid polymerizable ethylenically unsaturated monomer selected from the group consisting of a vinyl aromatic compound, vinyl chloride, vinyl acetate, vinyl propionate, vinylidene chloride, lower alkyl esters of acrylic acid, lower alkyl esters of methacrylic acid, acrylonitrile, butadiene, chloroprene, mixtures of said monomers and mixtures of at least one of said monomers with a preformed rubbery polymer of the group consisting of a copolymer of butadiene with styrene, a copolymer of butadiene with acrylonitrile, a copolymer of butadiene with a lower isoolefine, polybutadiene and natural rubber, as a finely dispersed suspension in water at raised temperatures in the presence of a small quantity of finely divided particles of a hydroxy phosphate of the group consisting of calcium, barium and magnesium, about 0.005 to 0.15 percent of a water soluble anionic surfactant, about 0.003 to 0.004 percent of lecithin, and a small quantity of a peroxy polymerization catalyst, all quantities being by weight of the suspension.

References Cited in the file of this patent

UNITED STATES PATENTS

| 2,668,806 | Haward et al. | Feb. 9, 1954 |
| 2,673,194 | Grim | Mar. 23, 1954 |

OTHER REFERENCES

J. Polymer Sc., 5, 191–200, April 1950.
J. Soc. Chem. Ind., 59, 185–9, September 1940.